United States Patent [19]
Froger et al.

[11] Patent Number: 6,095,629
[45] Date of Patent: Aug. 1, 2000

[54] DEVICE FOR DETERMINING QUANTITIES OF CONSUMABLE PRODUCTS CONTAINED IN RESERVOIRS AND A DOCUMENT PRINTING DEVICE HAVING SEVERAL DIFFERENT RESERVOIRS OF PIGMENTED PRODUCTS

[75] Inventors: Marie-Hélène Froger, Chateaugiron; Pascal Coudray, La Chapelle des Fougeretz, both of France

[73] Assignee: Canon Kabushiki Kaisha, Tokyo, Japan

[21] Appl. No.: 09/104,013

[22] Filed: Jun. 24, 1998

[30] Foreign Application Priority Data

Jun. 27, 1997 [FR] France ................... 97 08127

[51] Int. Cl.⁷ .............. B41J 2/175; G01F 23/26
[52] U.S. Cl. .............................. 347/7; 73/304 C
[58] Field of Search ................ 347/7; 399/27, 399/61; 73/304 C; 340/617

[56] References Cited

U.S. PATENT DOCUMENTS 4,133,453  1/1979  Ohbora ........................ 222/39
5,465,619  11/1995  Sotack et al. .................. 73/304

FOREIGN PATENT DOCUMENTS

| 0610041 | 8/1994 | European Pat. Off. . |
| 2-169259 | 6/1990 | Japan . |
| 6-135001 | 5/1994 | Japan . |
| 9-166474 | 6/1997 | Japan . |
| 2022259 | 12/1979 | United Kingdom . |

Primary Examiner—Joan Pendegrass
Attorney, Agent, or Firm—Fitzpatrick, Cella, Harper & Scinto

[57] ABSTRACT

Device for determining quantities of products contained in adjacent ones of plural reservoirs, by using a capacitive arrangement. According to the invention, two electrodes of the capacitive arrangement are disposed between two reservoirs and are in each case either sending electrodes to which a signal is applied, or receiving electrodes which transmit a signal. By virtue of this arrangement, it is possible to reduce parasitic coupling between different capacitors of the capacitive arrangement.

32 Claims, 5 Drawing Sheets

DEVICE FOR DETERMINING QUANTITIES OF CONSUMABLE PRODUCTS CONTAINED IN RESERVOIRS AND A DOCUMENT PRINTING DEVICE HAVING SEVERAL DIFFERENT RESERVOIRS OF PIGMENTED PRODUCTS

The invention relates to a device for determining quantities of consumable products contained in several reservoirs. As a main application, the invention also concerns a document printing device having several different reservoirs of ink or similar pigmented products, associated with printing means. It concerns more particularly means of determining quantities of products respectively contained in these reservoirs, using a capacitive arrangement.

A number of ways for detecting a level of ink in a reservoir of a printing device are known. Notably, association with the reservoir is known of a capacitive arrangement to which an excitation signal, generally a high-frequency alternating signal, is applied. It is known that the signal transmitted by such a capacitive arrangement varies according to the quantity of ink remaining in the reservoir. This variation can therefore be used to indicate to the user the fill level of the reservoir or at least the fact that a minimum level has been reached. Such information allows the user to refill the reservoir or to change a cartridge comprising such a reservoir, often associated with an ink-jet print head. The capacitive arrangement is such that at least one capacitor of relatively small capacitance (a few picofarads) is constituted so that the reservoir is located or can be located at a given instant between electrodes of such a capacitor.

By way of example, the document EP 0 028 399 describes a method for detecting the minimum level of ink in a reservoir, using a resonant circuit, the capacitor of which is formed by two metal plates (electrodes) between which the ink reservoir is located. The latter therefore fills the dielectric space of such a capacitor and the quantity of ink has a direct effect on the permittivity of the said dielectric space, and therefore the value of the capacitance. The resonant circuit is calibrated so that its resonant frequency and the maximum voltage at its measurement resistance are reached when the level of ink has fallen to a predetermined value. When resonance is achieved, a signal which can be used for signalling is sent. Consequently, with such a system, the only information available is an indication of the fact that the ink level is or is not above a predetermined low threshold.

In addition, for colour reproduction, the device must have several reservoirs containing different inks or pigmented products. Typically, good colour reproduction requires the use of at least three inks or pigmented products of different colours, yellow, cyan and magenta. Black is generally added thereto. For example, such a device comprises a carriage constrained to move along a guidance means arranged opposite a mechanism for moving an information medium such as a sheet of paper. This carriage carries at least the printing means, such as for example a corresponding number of ink-jet print heads and, usually, the reservoirs themselves, each containing a certain quantity of pigmented product. The reservoirs can be removable and exchangeable. Others can be designed so as to be able to be filled by the user when the latter is informed that the level of ink or pigmented product has reached or is below a predetermined value. The capacitive arrangement indicated above forms part of the means for determining the quantity of ink or pigmented product remaining in each reservoir. The capacitors of this capacitive arrangement have electrodes, for example metal plates or metallizations on certain walls of the reservoirs. It is necessary to select in turn the electrodes concerning such or such reservoir in order to effect the measurement of the levels, reservoir by reservoir. However, the latter are generally grouped together side by side so that stray capacitances may form, by construction or because of the imperfection of some components, between capacitors corresponding to different reservoirs, which is such as to falsify the measurements.

The aim of the invention is to resolve this problem by preventing or greatly limiting, by design, the formation of stray capacitances between the capacitors associated with different reservoirs.

Thus the invention concerns a device for determining quantities of consumable products respectively contained in reservoirs and comprising a capacitive arrangement including at least two metal electrodes associated with each reservoir, a so-called sending electrode connected to an excitation signal generator and a so-called receiving electrode connected to detection and measurement means, characterised in that the said reservoirs are installed side by side, in that two aforementioned electrodes of the capacitive arrangement are disposed between two adjacent reservoirs and respectively associated with the latter, and in that these electrodes are both either sending electrodes or receiving electrodes.

The invention also concerns a document-printing device having several different reservoirs of inks or similar pigmented products, associated with printing means and means of determining quantities of products respectively contained in these reservoirs, these determination means comprising a capacitive arrangement including at least two metal electrodes associated with each reservoir, a so-called sending electrode connected to an excitation-signal generator for receiving a signal delivered by the latter and a so-called receiving electrode connected to detection and measurement means suitable for receiving and processing a resultant signal representing the quantity of product present in the corresponding reservoir, characterised in that the said reservoirs are installed side by side, in that two such aforementioned electrodes of the capacitive arrangement are disposed between two adjacent reservoirs and are respectively associated with these, and in that these two electrodes are both either sending electrodes or receiving electrodes.

Advantageously, the said reservoirs are installed on a support comprising separators. Each separator carries two sending or receiving electrodes and at least elements for electrical connection to such electrodes.

According to a preferred embodiment, the separators form parallel walls, made of insulating material, so that the electrodes are situated between a face of such a wall and an adjacent face of the reservoir. However, because each wall forming a separator carries two sending electrodes or two receiving electrodes, no stray capacitive effect between the said electrodes carried by the same separator can give rise to any interference in the measurements.

The said electrodes can be metal plates carried by the separators. Each plate can be elastically forced, by a spring, in the direction of the wall of the reservoir against which it is applied. As a variant, the electrodes can be carried by the reservoirs; they can notably be produced by metallizations on certain surfaces of the walls of the reservoirs, as indicated above. In this case, the said separators may be equipped only with elements for electrical connection to such electrodes.

Where the consumable pigmented product, that is to say the ink, is an electrically conductive product and where the walls of the reservoir are made of insulating material, the capacitive arrangement defined above can consist of one or more capacitors. Each capacitor is then defined by a metal external conductive electrode, against an external face of the said reservoir, on the one hand, and by the conducting liquid itself, contained in the reservoir, on the other hand. The liquid constitutes another electrode whose surface is in some way variable and depends on the quantity of product contained in the reservoir at a given moment. In this case, the dialectric of the capacitor is formed by the insulating wall of the reservoir.

A reservoir of this type is also known made of insulating material, comprising two compartments, respectively an upstream compartment where the pigmented product (that is to say the conductive ink) is in the free state and a downstream compartment where it is in the captive state.

According to one possible embodiment, the ink in the downstream compartment impregnates a porous body. It has been found that such a porous body impregnated with a conductive ink behaves as an impedance with however an essentially real component. It is in this sense that it is possible to consider that the ink is conductive as indicated above, including in the downstream compartment.

The two compartments communicate through a passage whilst the downstream compartment containing the porous body communicates with a flow outlet for the consumption of the pigmented product. More precisely, this flow outlet is connected to a corresponding print head, more particularly to an ink-jet print head.

As is known, the porous body enables the flow of liquid to this print head to be better controlled.

On the other hand, a larger quantity of ink can be stored, all other things being equal, in the upstream compartment which has no porous body. The ink contained in this upstream compartment is absorbed progressively by the porous body as the print head is used.

The quantity of ink contained in the porous body remains approximately constant as long as the upstream compartment contains pigmented product. On the other hand, as soon as the upstream compartment is empty, the porous body progressively contains less and less ink, until it is completely exhausted.

According to another remarkable characteristic of the invention, the shape of the electrodes is optimised in order to make it possible to measure the change in the level of ink or pigmented product both in the upstream compartment and, thereafter, in the downstream compartment, with the best possible precision and sensitivity.

More precisely, the invention also concerns a document printing device according to the above definition in which the said reservoirs are made of insulating material and contain electrically conductive pigmented products and in which each reservoir comprises two compartments, respectively an upstream compartment in which the said product is in the free state and a downstream compartment in which the said product is in the captive state, the said compartments communicating through a passage and the said downstream compartment communicating with a flow outlet for the consumption of the said pigmented product, characterised in that, for each reservoir, aforementioned electrodes are arranged against two opposite parallel faces thereof, in that each is L shaped and in that they are disposed opposite each other and head to tail, so that the parts thereof which are applied against the said downstream compartment are offset with respect to each other so as to be situated respectively in the vicinity of two opposite ends of the said downstream compartment or at least of a part of the reservoir occupied by the porous body, that is to say the region where the pigmented product is in the captive state.

The invention will be better understood and other advantages of it will emerge more clearly in the light of the following description of a document printing device in accordance with the invention and including notably a device for determining the quantity of ink remaining in a reservoir complying with the preceding definition, given solely by way of example and produced with reference to the accompanying drawings in which:

Figure 1:
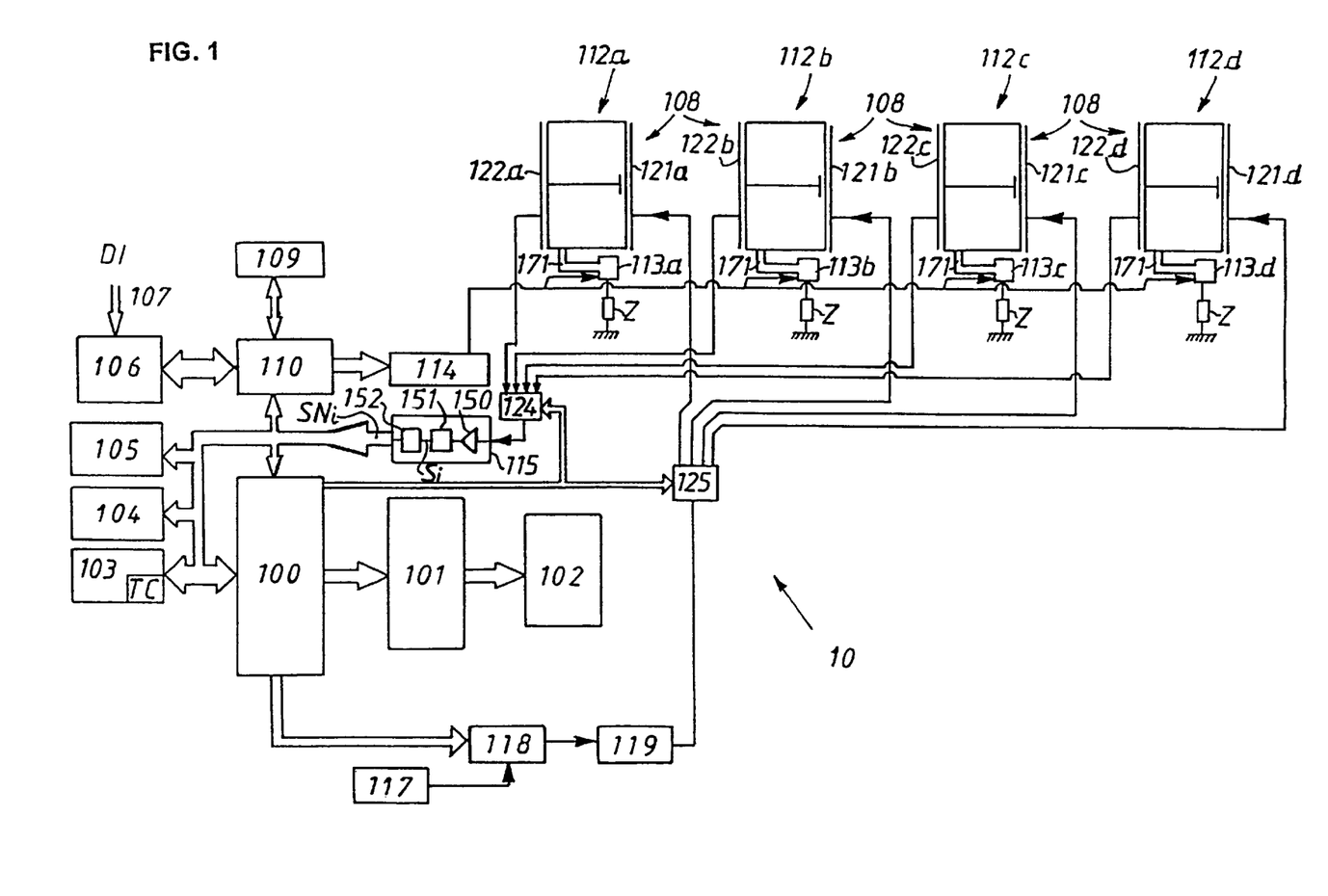
FIG. 1 is a block diagram of a preferred embodiment of the printing device.
Figure 2:
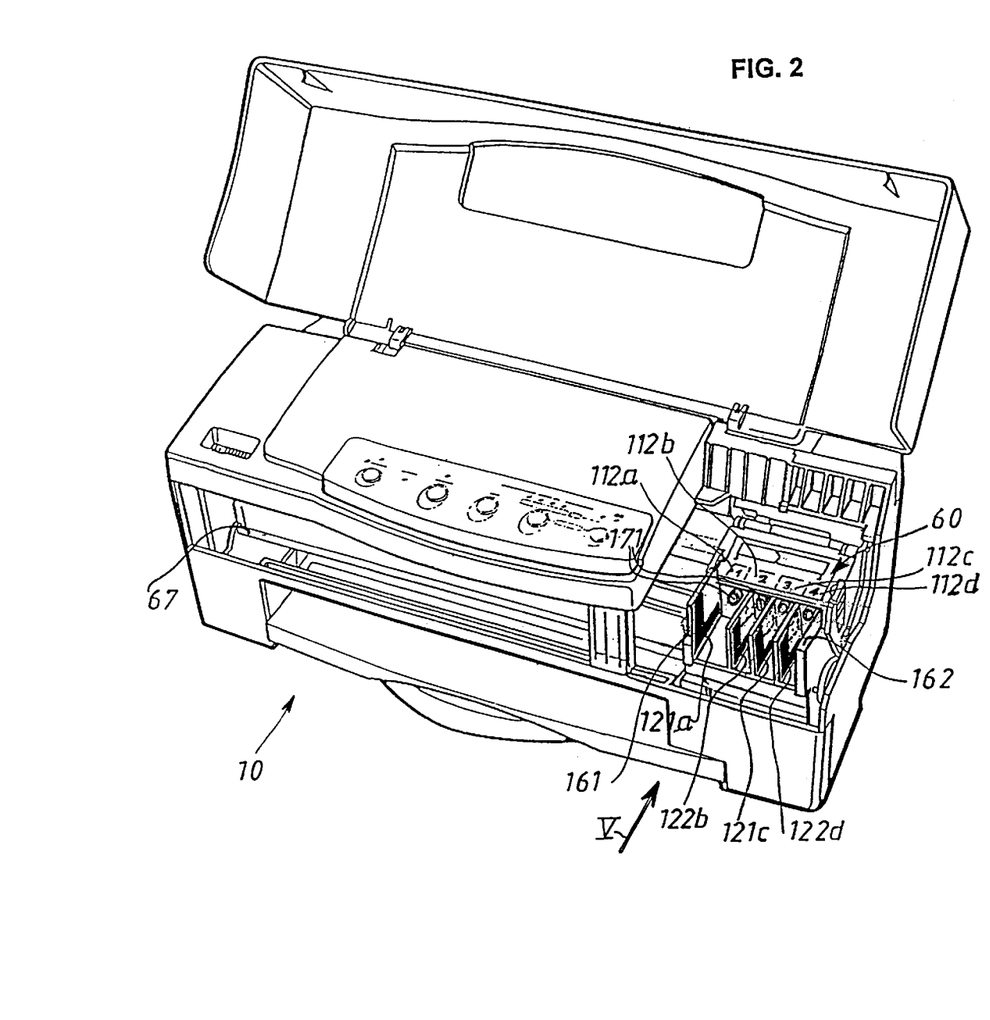
FIG. 2 is a simplified perspective view of this same printing device.
Figure 3:
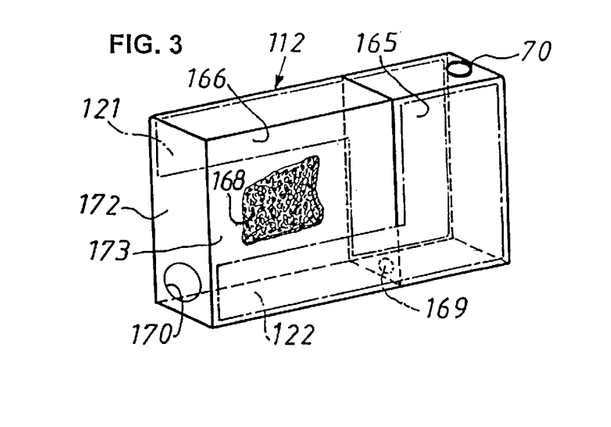
FIG. 3 is a simplified schematic view of a reservoir of this printing device, with partial cutaway.

Referring more particularly to FIGS. 1 to 3, a colour printer 10 has been depicted which receives data to be printed DI, representing text or an image, by means of a parallel input/output port 107, connected to an interface circuit 106 itself connected to an ink ejection control circuit 110 which controls four print heads 113$a$, 113$b$, 113$c$, 113$d$ by way of an amplification circuit 114. Each print head is connected to a reservoir of ink or similar pigmented product, allowing colour printing. The four reservoirs 112$a$, 112$b$, 112$c$, 112$d$ contain inks or other liquid pigmented products of different colours, in this case, yellow, cyan, magenta and black. The reservoir 112$a$ filled with black ink has a volume substantially larger than that of the other three. The print heads and reservoirs are mounted on a carriage 60 constrained to move along a guidance means 67 formed by rails. The carriage 60 is moved with reciprocating motion along these guidance rails. It is driven by a motor 102 by means of a belt device, not depicted but conventional and well known to persons skilled in the art. The movement path of the carriage and therefore of the print heads 113$a$–113$d$ is parallel to a line to be printed on a print medium such as a sheet of paper. This print medium is moved perpendicular to the movement path of the carriage by the printer mechanism, known per se.

The printer also has a main data processing circuit 100 associated with a read-only memory 103 and with a random access memory 109. The read-only memory 103 contains the operating programs of the main processing circuit while the random access memory 109, also associated with the ink ejection control circuit 110, temporarily stores the data received by means of the interface 106 as well as the data produced by the main processing circuit 100. The latter is connected to a display 104 on which it controls the display of messages representing the operation of the printer.

As will be seen later, information on the quantities of ink remaining in the four reservoirs respectively associated with the four print heads appears among these messages. The main processing circuit 100 is connected to a keypad 105 by means of which the user can transmit operating commands to the printer. The processing circuit also controls the motor 102 for driving the carriage by means of an amplification circuit 101. This motor is here advantageously of the stepping type.

The printing device also has means of determining quantitites of pigmented products respectively contained in the reservoirs. These determination means comprise a capacitive arrangement 108 including at least two metal electrodes 121, 122 associated with each reservoir. A so-called sending electrode 121 can be seen, connected to an excitation-signal generator 117 via, notably, an amplifier 119 and a so-called receiving electrode 122 connected to detection and measurement means 115 suitable for receiving and processing a signal transmitted by the said capacitive arrangement (in fact part thereof) and representing the quantity of product present in a corresponding reservoir.

The electrodes 121a, 122a correspond to the reservoir 112a, the electrodes 121b, 122b correspond to the reservoir 112b, the electrodes 121c, 122c correspond to the reservoir 112c and the electrodes 121d, 122d correspond to the reservoir 112d.

The detection and measurement means 115 are connected to the said receiving electrodes by way of first controlled selection means 124 making it possible to successively and cyclically select at least one electrode (possibly a group of electrodes), associated each time with a particular reservoir, in order to successively determine the quantities of product remaining in the different reservoirs, during one measurement cycle. Likewise, the excitation signal generator 117 is connected to the said sending electrodes by way of second controlled selection means 125, in order to successively and cyclically select at least one electrode (possibly a group of electrodes) associated each time respectively with this same aforementioned particular reservoir.

In the example, the excitation signal generator 117 is a high-frequency alternating signal generator connected to the input of the amplifier 119 by means of a switch 118 controlled by the main processing circuit 100. The first and second selection means 124, 125 are also controlled by the main processing circuit 100. The aforementioned detection and measurement means 115 include an envelope detector 151 connected to be linked to at least one receiving electrode selected by means of the said first selection means. An amplifier 150 is inserted between the selection means 124 and the input of the envelope detector. These detection and measurement means also include an analogue to digital converter 152 connected to convert a signal Si coming from the envelope detector into digital information SNi. This digital information is transmitted and used by the main processing circuit 100. In particular, the read-only memory 103 contains a look-up table TC where information representing the quantity of pigmented product remaining in a reservoir appears in correspondence with the digital information transmitted by the analogue to digital converter 152.

The main processing circuit 100 therefore performs a comparison between the information delivered by the converter 152 and the table TC, in order to determine the quantity of pigmented product remaining in such and such reservoir. According to such a comparison it produces information and messages intended to be reproduced on the display 104 and/or transmitted on a link BUS to other operating systems.

The reservoirs 112a, 112d are installed side by side on a support 156 carried by the carriage 60; they are removable and exchangeable. The installation of a reservoir on this support results in its connection to the corresponding print head 113a–113d. The four print heads are installed permanently on the carriage 60.

According to another conventional embodiment, not depicted, each reservoir 112 and the corresponding print head 113 form one and the same exchangeable cartridge. If the reservoirs are exchangeable, one of the messages produced by the main processing circuit can indicate the necessity of changing such and such reservoir. If, on the contrary, the reservoirs are intended to be refilled when this is necessary, they each have a refilling aperture 70 and one of the messages produced by the main processing circuit can indicate the necessity of refilling such and such reservoir.

The reservoirs 112a–112d are installed side by side on the support 156. They are not depicted in FIGS. 2 and 5, but their locations are marked by the references 112a–112d in FIG. 2. This support 156 comprises separators 157, 158, 159 between which reservoirs are inserted. In the example, the separators form parallel walls. Each separator carries two electrodes 121 or 122, respectively associated with the two neighbouring reservoirs, and these two electrodes are, for each separator, either sending electrodes 121, that is to say ones connected to the second selection means 125, or receiving electrodes 122, that is to say ones connected to the first selection means 124. The support 156 also has two end retainers 161, 162 to hold the two reservoirs 112a, 112d which are closest to the lateral edges of the carriage 60. These end retainers are in the form of parallel walls similar to the separators. Each retainer carries an electrode associated with the neighbouring reservoir.

Figure 5:
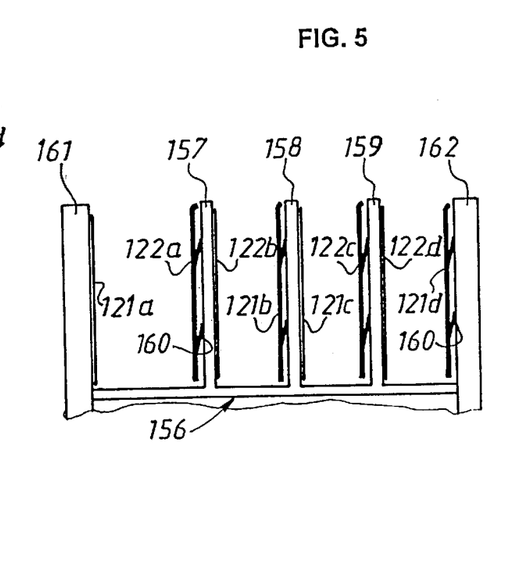
FIG. 5 is a schematic partial view of the capacitive arrangement viewed in the direction of the arrow V of FIG. 2.

More precisely, in accordance with the preceding description and according to one possible configuration, the retainer 161 carries the electrode 121a, the separator 158 carries the electrodes 122a, 122b, the separator 159 carries the electrodes 121b and 121c, the separator 160 carries the electrodes 122c and 122d and the retainer 162 carries the electrode 121d.

Each electrode is here composed of a metallic plate. At least one electrode per reservoir may advantageously be applied by elastic stressing means against the wall of the corresponding reservoir. The same applies for the electrode carried by at least one end retainer. Such stressing means may be implemented by one or more leaf springs 160 or similar.

As stated previously, the separators are not necessarily parallel walls, notably when the electrodes are defined by metallizations deposited on external surfaces of the reservoirs, as depicted in faint lines in FIG. 3. In this case, the separators and the end retainers may define a simple structure for housing the reservoirs and carry electrical connection elements making it possible, by simple contact, to connect the different electrodes to the selectors.

This particular layout of sending and receiving electrodes is optimum for reducing the parasitic effects indicated above, more or less accentuated according to the crosstalk levels existing between the cables and the different channels of the said first and second selection means 124, 125.

It should also be noted that this particular layout of sending and receiving electrodes may make it possible to simplify the selection means as described with reference to FIG. 1. In particular, removal of the second selection means 125 can be envisaged. In this case, all the aforementioned sending electrodes 121a–121d are interconnected directly together and linked to the excitation signal generator 117, and more particularly to the output of the amplifier 119.

Another advantageous characteristic of the device described lies in the particular form of the electrodes, making it possible to obtain good measurement sensitivity whatever the fill level of the reservoir 112 which is checked, in the particular case where this reservoir comprises two compartments, respectively an upstream compartment 165 where the product is in the free state and a downstream compartment 166 where it is in the captive state. The distinctive terms upstream and downstream are chosen according to the direction of flow of the product, as it is consumed. The downstream compartment is here filled with a porous body 168 in which the liquid pigmented product is in the so-called captive state. The compartments communicate by means of a passage 169 and the downstream compartment communicates with a flow output 170 for the consumption of the pigmented product, this output being of course connected to the corresponding ink-jet print head 113 by a duct 171. This type of reservoir is known. If it has a refilling aperture 70, this is located in the upper part of the upstream compartment.

Furthermore, in the example described, it contains a conductive pigmented product. Its walls are made of insulating material, that is to say, here, of plastic.

As depicted in FIG. 3, each reservoir 112 as a whole has the form of a right-angled parallelepiped and the two electrodes 121, 122 are applied against two opposite and parallel faces of the said reservoir. They extend facing both the upstream compartment 165 and the downstream compartment 166. The particular form of these electrodes will be explained later. It should be noted that the electrodes can be metallic plates or metallizations carried by the parallel faces of the reservoir.

Figure 6:
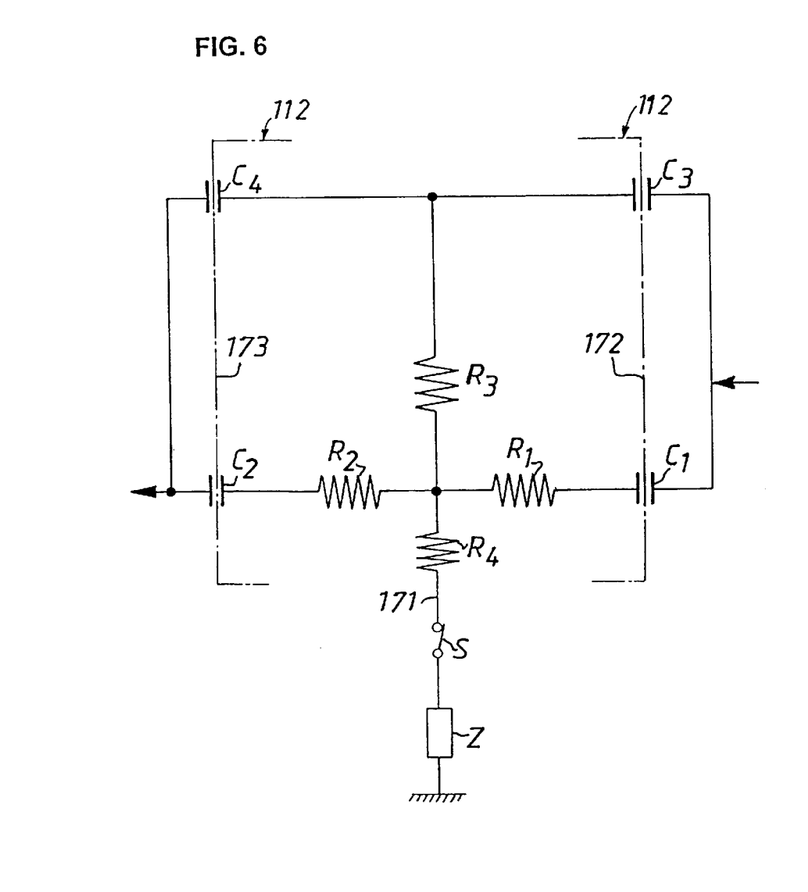
FIG. 6 is an equivalent electrical diagram of part of the capacitive arrangement associated with a reservoir and with the corresponding print head.

In all cases, the equivalent electrical diagram in FIG. 6 can be attributed to such a reservoir 112 provided with its two electrodes 121, 122 and associated with the corresponding print head 113.

The so-called "sending" electrode 121 defines, with the downstream compartment, a capacitor $C_1$ and, with the upstream compartment, a capacitor $C_3$. The dielectric of these two capacitors is constituted by the wall 172 of the reservoir. Likewise, the electrode 122 defines, with the downstream compartment, a capacitor $C_2$ and, with the upstream compartment, a capacitor $C_4$. The common dielectric of these two capacitors is constituted by the opposite wall 173 of the reservoir. As the resistivity inside the upstream reservoir is relatively low, it can be considered that the capacitors $C_3$ and $C_4$ are connected in series.

On the other hand, in the downstream compartment, the resistivity is higher; it increases when the porous body is no longer saturated after the upstream compartment has been completely emptied. Under these conditions, resistors $R_1$ and $R_2$ are inserted in series between the capacitors $C_1$ and $C_2$, a resistor $R_3$ is inserted between the common point of the capacitors $C_3$ and $C_4$ and the common point of the resistors $R_1$ and $R_2$ and a resistor $R_4$ is inserted between the common point of the resistors $R_1$, $R_2$ and $R_3$ and the impedance Z constituted by or representing the print head. The other "terminal" of the impedance Z is connected to earth. A normally closed switch S is interconnected between the resistor R4 and the impedance Z. This switch in fact represents the ink flow duct 171 between the output of the downstream compartment and the print head. It can be considered that this switch S opens when there is no longer any conductive ink in this small-sectioned duct. This can occur in a case of faulty operation but especially when the reservoir is completely empty. When the upstream compartment empties, the capacitances of the capacitors $C_3$ and $C_4$ decrease progressively since the surface area of conductive ink facing the parts of the electrodes applied against the faces of this upstream compartment decreases. Subsequently, when the upstream compartment is empty and the downstream compartment dries out until completely drained of ink, it is the capacitances $C_1$ and $C_2$ which progressively decrease. At the same time, the values of the resistors $R_1$ to $R_4$ increase.

Finally, when the ink runs out in the small-section duct 171 which connects the downstream compartment to the print head, from the electrical point of view, the switch S opens, isolating the part of the capacitive arrangement associated with this reservoir from the print head and, consequently, from earth.

All these variations result in a significant decrease in the high-frequency alternating voltage transmitted by the capacitive arrangement as the quantity of conductive ink in the reservoir in question decreases.

Figure 4:
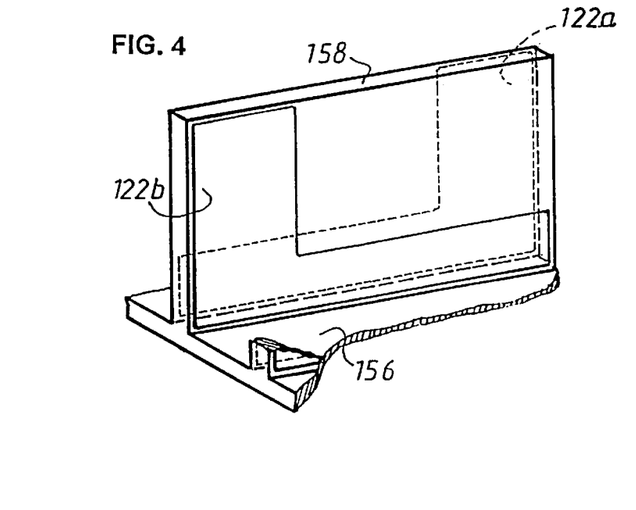
FIG. 4 is a detailed perspective view showing a separator disposed between two reservoirs and carrying two electrodes.

As can be seen in FIGS. 3 and 4, the two metallic electrodes associated with one and the same reservoir are arranged in a manner which is specific and at present considered optimum, making this variation in the transmitted voltage more characteristic and more usable.

More precisely, these two electrodes, 121, 122, which are arranged against two opposite parallel faces of the reservoir, are each L shaped and are disposed opposite each other and head to tail, so that the parts 172, 173 thereof, which are applied against the downstream compartment 166, are offset with respect to each other so as to be situated respectively in the vicinity of two opposite ends of the said downstream compartment, in this case here a top end and a bottom end, adjacent to the outlet duct. On the upstream compartment side, the opposing electrode parts are face to face over practically the entire height of the said upstream compartment.

Figure 7:
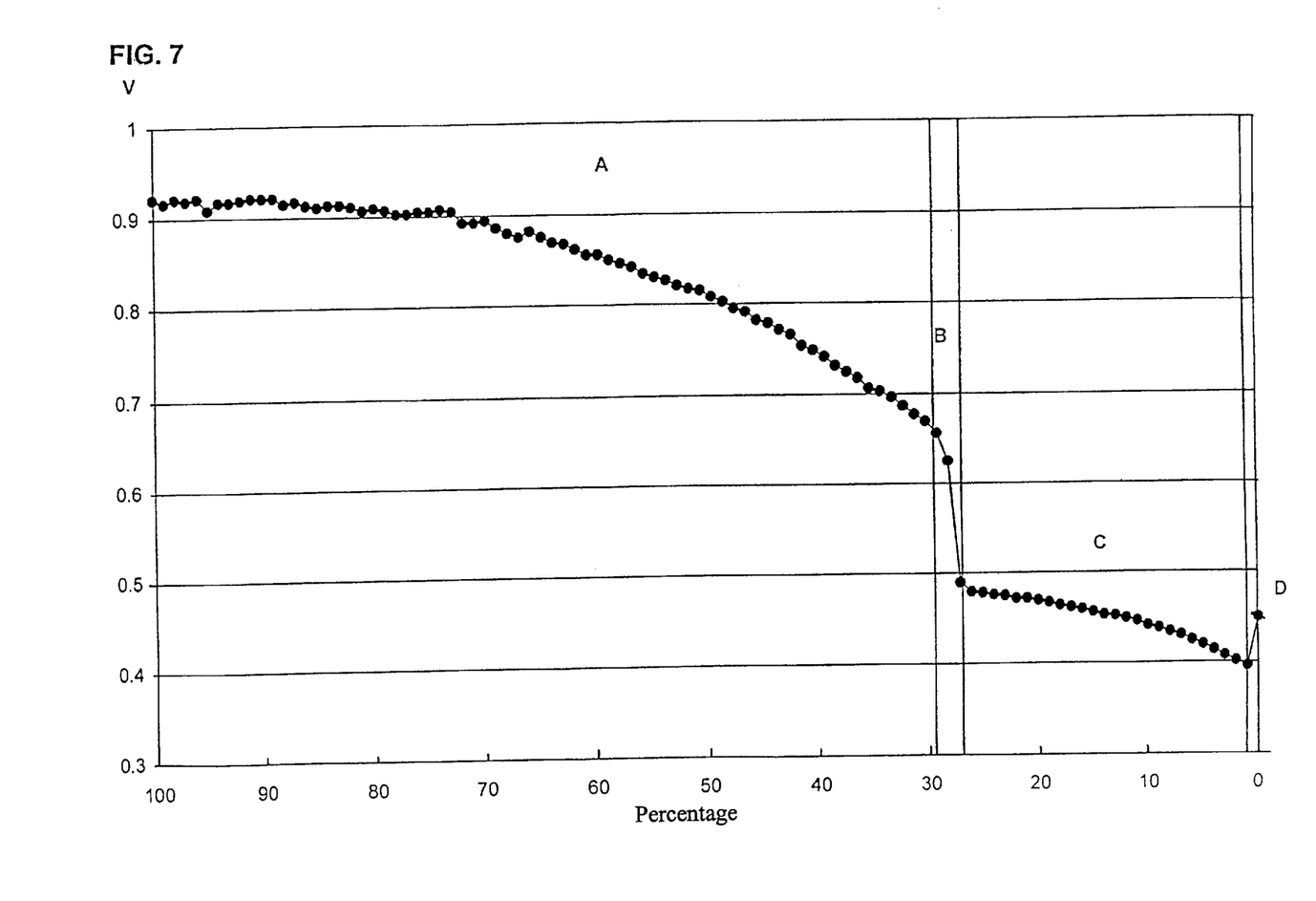
FIG. 7 is a graph illustrating the voltage of the signal transmitted by the capacitive arrangement according to the quantity of ink remaining in the reservoir.

FIG. 7 illustrates this variation in the amplitude of the alternating signal transmitted by the capacitive arrangement according to the percentage of product remaining in the reservoir. Over the first part (zone A) the voltage of the signal sensed by the detection and measurement means 115 decreases slowly. This change corresponds to the drop in level in the upstream compartment until the latter is completely drained (zone B).

Zone C corresponds to the progressive drying out of the porous body. Zone D corresponds to the "opening" of the switch S, that is to say to the disappearance of the product in the duct 171 connecting the flow output to the corresponding print head 113.

Figure 8:
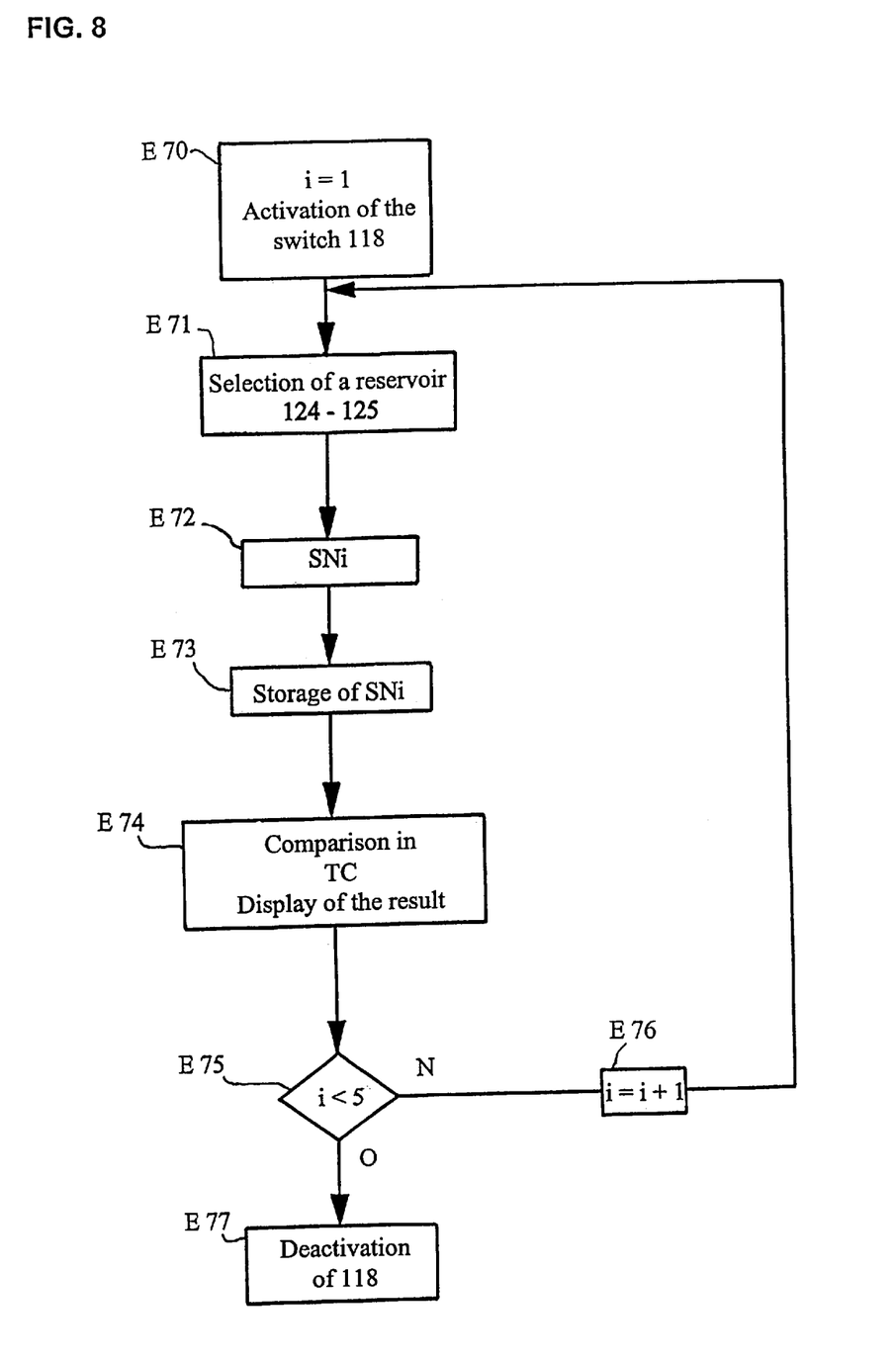
FIG. 8 is a flow diagram of a program residing in read-only memory and implementing the invention.

FIG. 8 is an algorithm which illustrates the operation of the means of determining the quantities of products respectively contained in the reservoirs. This algorithm comprises eight steps, E70 to E77, which are performed periodically when the main processing circuit controls the said selection means. Preferably, this cycle takes place when the carriage is in a predetermined position and the system is not in normal printing operation. This algorithm can then take place before the printing of a document page. It makes it possible to determine the quantity of ink remaining in each reservoir.

The step E70 consists of positioning the switch 118 to allow passage of the signal delivered by the oscillator 117 to the amplifier. The number i of reservoirs to be checked is initialised; i=1.

At E71, one reservoir from the four is selected, by means of the said first and second selection means 124, 125, controlled by the main processing circuit 100.

At the step E72, the high-frequency alternating signal which is transmitted to the detection and measurement means 115 by the part of the capacitive arrangement which is concerned, is converted into digital information. This information SNi is stored in the random access memory at the step E73. The main processing circuit then consults the look-up table TC written in read-only memory in order to determine the quantity of ink corresponding to the information SNi. The step E75 is a test which checks whether the number i of cartridges to be measured is less than 5. In the negative, i is incremented by one unit at the step E76 and the process returns to the step E71. Each step E74 is accompanied by a display of the quantity of ink present in the corresponding reservoir. When the result of the test E75 is positive, that is to say when i is equal to 5, all the reservoirs have been checked and the main processing circuit goes to the step E77, which deactivates the switch 118. At this time, the results of the measurements are displayed on the display means possibly accompanied by a message indicating to the user the necessity of taking action, either by changing such and such reservoir, or by refilling it with conductive pigmented product, using the refilling aperture opening into the upstream compartment.

What is claimed is:

1. Device for determining quantities of consumable products contained in respective ones of plural reservoirs, comprising:
   a capacitive arrangement including at least two electrodes associated with each reservoir, said two electrodes including a sending electrode connected to an excitation-signal generator and a receiving electrode connected to detection and measurement means,
   wherein said reservoirs are installed side by side, and
   wherein the two electrodes of the capacitive arrangement constitute either a sending electrode or a receiving electrode and are disposed between two adjacent reservoirs and respectively associated with said two adjacent reservoirs.

2. Device according to claim 1, characterised in that the said reservoirs are installed on a support (156) comprising separators (157, 158, 159) and in that each separator carries two aforementioned sending or receiving electrodes or at least elements for electrical connection to such electrodes.

3. Device according to claim 2, characterised in that the said separators (157,158,159) form parallel walls.

4. Device according to claims 2 or 3, characterised in that the said support also has two end retainers (161, 162), for example in the form of parallel walls, each retainer carrying or being electrically connected to at least one electrode associated with the adjacent reservoir or at least one element for electrical connection to such an electrode.

5. Device according to any one of claims 1–3, characterised in that the said detection means are connected to the said receiving electrodes, via first controlled selection means (124).

6. Device according to any one of claims 1–3, characterised in that the said excitation signal generator is connected to the said sending electrodes via second controlled selection means (125).

7. Device according to claim 3, characterised in that the said electrodes are plates carried by the said separators.

8. Document printing device having plural different reservoirs of ink or similar pigmented products associated with printing means and determination means for determining quantities of products respectively contained in these reservoirs, said determination means comprising:
   a capacitive arrangement including at least two electrodes associated with each reservoir, said two electrodes including a sending electrode connected to an excitation-signal generator and a receiving electrode connected to detection means suitable for receiving and processing a resulting signal representing the quantity of product present in the corresponding reservoir,
   wherein said reservoirs are installed side by side, and
   wherein the two electrodes of the capacitive arrangement constitute either a sending electrode or a receiving electrode and are disposed between two adjacent reservoirs and respectively associated with said two adjacent reservoirs.

9. Device according to claim 8, characterised in that the said reservoirs are installed on a support (156) comprising separators (157, 158, 159) and in that each separator carries two aforementioned sending or receiving electrodes or at least elements for electrical connection to such electrodes.

10. Device according to claims 8 or 9, characterised in that the said separators (157, 158) form parallel walls.

11. Device according to claim 10, characterised in that the said support also has two end retainers (161, 162), for example in the form of parallel walls, each retainer carrying or being electrically connected to at least one electrode associated with the adjacent reservoir or at least one element for electrical connection to such an electrode.

12. Device according to claim 9, characterised in that the said electrodes are metal plates carried by the said separators.

13. Device according to claim 11, characterised in that the said electrode of each aforementioned end retainer is a metal plate carried by the latter.

14. Device according to claim 12, characterised in that such a metal plate is applied in the direction of the wall of the reservoir against which it is applied by means of elastic stressing means (160).

15. Device according to claim 9, characterised in that the said electrodes are defined by metallizations deposited on the external surfaces of the reservoirs.

16. Device according to claim 9, characterised in that the said detection and measurement means are connected to the said receiving electrodes via first selection means (124) controlled so as to successively and cyclically select one or more electrodes, each time associated with a reservoir in order to determine the quantities of product remaining in the different reservoirs.

17. Device according to claim 16, characterised in that the said excitation signal generator is connected to the said sending electrodes via second selection means (125) controlled so as to successively and cyclically select one or more electrodes, each time associated with a reservoir in order to determine the quantities of product remaining in the different reservoirs.

18. Device according to claim 16, characterised in that all the aforementioned sending electrodes are directly interconnected together and connected to the said excitation signal generator.

19. Device according to one of claims 8, 9, 12, 14 or 15–18, in which the said reservoirs are made from insulating material and contain electrically conductive pigmented products and in which each reservoir (112) comprises two compartments, respectively an upstream compartment (165) where the said product is in the free state and a downstream compartment (166) in which the said product is in the captive state, the said compartments communicating through a passage and the said downstream compartment communicating with a flow outlet for consumption of the said pigmented product, characterised in that, for each reservoir, aforementioned electrodes are arranged against two opposite parallel faces thereof, and in that each is L shaped and in that they are disposed opposite each other and head to tail, so that the parts thereof which are applied against the said downstream compartment are offset with respect to each other so as to be situated respectively in the vicinity of two opposite ends of the said downstream compartment.

20. Device according to claim 19, characterised in that the said downstream compartment is filled with a porous body (168) in which the said pigmented product is in the so-called "captive" state.

21. Device according to claim 18, characterised in that the said reservoir has a filling orifice (70) opening out in the said upstream compartment.

22. Device according to one of claims 8, 9, 12, 14 or 15–18, characterised in that the said excitation-signal generator (117) is a high-frequency alternating signal generator.

23. Device according to claim 22, characterised in that the aforementioned detection means include an envelope detector (151) connected so as to be linked to the said receiving electrodes.

24. Device according to claim 23, characterised in that the said detection means include an analogue to digital converter (152) connected so as to convert a signal coming from the said envelope detector into digital information.

25. Device according to one of claims 8, 9, 12, 14 or 15–18, characterised in that it comprises a carriage (60) constrained to move along a guidance means arranged opposite a mechanism for moving an information medium and in that the aforementioned support carrying the said reservoirs forms part of this carriage.

26. Device according to claim 23, characterised in that it has a main processing circuit (100) and a read only memory (103) in which is entered information representing the quantitiy of pigmented product remaining in a reservoir and corresponding to the digital information transmitted by the detection means.

27. Device according to claims 16 or 17, characterised in that the said main processing circuit is able to control the said first and/or second selection means (124, 125) if the said carriage is situated in a predetermined position.

28. Device according to one of claims 8, 9, 12, 14 or 15–18, characterised in that it has means (104) of displaying an item of information representing the quantity of ink or pigmented product present in each reservoir.

29. Cartridge for recharging ink or pigmented product for a document-printing device having at least one reservoir, characterised in that conductive surfaces carried by faces of this reservoir form L-shaped capacitor electrodes, disposed head to tail and forming part of a capacitive arrangement for determining the level of ink or pigmented product present in the said reservoir.

30. Office machine, characterised in that it has a device according to one of claims 8, 9, 12, 14 or 15–18.

31. Office machine according to claim 30, characterised in that it constitutes essentially a facsimile machine.

32. Office machine according to claim 30, characterised in that it constitutes essentially a printer.

* * * * *

UNITED STATES PATENT AND TRADEMARK OFFICE
CERTIFICATE OF CORRECTION

PATENT NO. : 6,095,629
DATED : August 1, 2000
INVENTOR(S) : Marie-Helene Froger and Pascal Coudray It is certified that error appears in the above-identified patent and that said Letters Patent is hereby corrected as shown below:

Column 3,
Line 8, change "dialectric" to -- dielectric --.

Column 10,
Line 12, change "(157, 158)" to -- (157, 158, 159) --.

Column 12,
Line 1, change "quantitiy" to -- quantity --.

Signed and Sealed this

Eighteenth Day of January, 2005

JON W. DUDAS
*Director of the United States Patent and Trademark Office*